(12) United States Patent
Dvornic et al.

(10) Patent No.: US 6,350,384 B1
(45) Date of Patent: Feb. 26, 2002

(54) SILICON CONTAINING MULTI-ARM STAR POLYMERS

(75) Inventors: Petar Radivoj Dvornic; Jin Hu, both of Midland, MI (US); Agnes M. de Leuze-Jallouli, Largo, FL (US); Michael James Owen; Paul Lane Parham, both of Midland, MI (US); Susan Victoria Perz, Essexville, MI (US); Scott Daniel Reeves, Framingham, MA (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/637,924

(22) Filed: Aug. 14, 2000

(51) Int. Cl.⁷ .................................................. C02F 1/62
(52) U.S. Cl. ........................ 210/688; 524/430; 524/431; 524/432; 525/431; 525/474; 525/936; 210/912
(58) Field of Search .................................. 525/431, 936, 525/474, 430, 432; 210/688, 912

(56) References Cited

U.S. PATENT DOCUMENTS

| | | | |
|---|---|---|---|
| 5,387,617 A | 2/1995 | Hedstrand et al. | 521/79 |
| 5,560,929 A | 10/1996 | Hedstrand et al. | 424/486 |
| 5,739,218 A | 4/1998 | Dvornic et al. | 525/487 |
| 5,902,863 A | 5/1999 | Dvornic et al. | 525/431 |
| 5,938,934 A | 8/1999 | Balogh et al. | 210/688 |

Primary Examiner—Margaret G. Moore
Assistant Examiner—Marc S. Zimmer
(74) Attorney, Agent, or Firm—James L. DeCesare

(57) ABSTRACT

Multi-arm star polymers are derived from silicon containing dendrimers and have arms containing the moiety

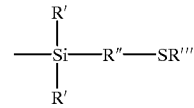

where each R' can be the same or different and is an alkyl group containing 1–6 carbon atoms such as methyl and ethyl or an aryl group such as phenyl; R" is alkylene radical —$(CH_2)_a$— in which a has a value of 2 or 3; and R'" is the —$(CH_2)_b CH_3$ group in which b has a value of 1–50. These compositions can be used for dissolving metals and other electrophiles.

14 Claims, No Drawings

SILICON CONTAINING MULTI-ARM STAR POLYMERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to certain compositions of matter including multi-arm star polymers derived from silicon containing dendrimers in which the arms of the resulting star polymer contain in their molecule the characteristic moiety

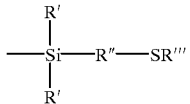

where each R' can be the same or different and is an alkyl group containing 1–6 carbon atoms such as methyl and ethyl or an aryl group such as phenyl; R" is alkylene radical —$(CH_2)_a$— in which a has a value of 2 or 3; and R''' is the —$(CH_2)_b CH_3$ group in which b has a value of 1–50. The invention is also directed to the use of such compositions of matter, and the use of multi-arm star polymers derived from amine or imine terminated dendrimers which have been epoxidized with monofunctional glycidoxy organosilicon compositions, for dissolving metals and other electrophiles.

BACKGROUND OF THE INVENTION

While U.S. Pat. No. 5,902,863 (May 11, 1999) and U.S. Pat. No. 5,938,934 (Aug. 17, 1999) describe networks containing dendrimers having in their molecule groups at the outer surface containing the moiety

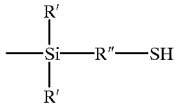

these prior art patents do not describe any dendrimers containing the moiety

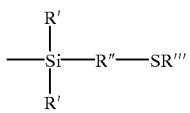

where R', R", and R''' have the same meaning as defined above.

This is a significant distinction since the prior art compositions containing an —SH moiety are inherently very reactive, possess an odor of rotten eggs, and are very unstable when exposed to open environment. In contrast, compositions of this invention containing the —SR''' moiety are inherently non-reactive, possess no odor, and are very stable when exposed to open environment. In addition, prior art compositions containing the —SH moiety have very limited use, i.e., for preparing networks or other dendrimers; whereas compositions of the invention containing the —SR''' moiety have a variety of uses as discussed hereafter.

While U.S. Pat. No. 5,739,218 (Apr. 14, 1999) describes certain dendrimer compositions obtained by epoxidation of amine or imine terminated dendrimers, it does not suggest use of the resulting dendrimers for dissolving metals and other electrophiles. Such a use cannot be inferred from a consideration of U.S. Pat. No. 5,938,934, since the '934 patent relates specifically to the use of networks prepared from such dendrimers, rather than to the use of the dendrimer composition itself which is not a network. This is a significant distinction when one considers that networks of dendrimers, i.e., crosslinked molecules, are generally insoluble in all solvents, whereas the non-crosslinked dendrimers themselves are generally soluble in many solvents.

Lastly, dendrimers and star polymers according to this invention should not be confused with dendrimers and star polymers described in U.S. Pat. No. 5,387,617 (Feb. 7, 1995) and U.S. Pat. No. 5,560,929 (Oct. 1, 1996), since the hydrophobic tail used to cap dendrimers and star polymers in the '617 and '929 patents does not contain silicon atoms. Rather, the capping materials used in the '617 and '929 patents are hydrocarbon chlorides and bromides such as cetyl bromide or α,β-epoxides derived from epoxidation of terminal olefins such as 1,2-epoxydecane.

BRIEF SUMMARY OF THE INVENTION

This invention is directed to multi-arm star polymers containing a hydrophilic dendritic core and hydrophobic silicon containing arms. The number of arms per molecule is dependent upon the functionality of the dendrimer precursor used in its synthesis, and the degree of conversion achieved during the synthesis. Depending upon the density of functionality, i.e., the generation of the dendrimer precursor used in the synthesis, the number of arms may range from 3 to several thousand, but generally the number of arms will range between 3–4,000, preferably 4–300.

Dendrimer precursors suitable for use in the manufacture of these multi-arm star polymers may consist of a polyamidoamine (PAMAM), polypropyleneimine (PPI), poly(amidoamine-organosilicon) (PAMAMOS), or poly(propyleneimine-organosilicon) (PPIOS), dendrimer. Each of the arms of the multi-arm star polymers contain silicon, and the number of silicon atoms in each of the arms of the star polymer can vary from a single silicon atom to as many as about 30 silicon atoms.

In general, these multi-arm star polymers can be prepared by two different synthetic processes. A first method involves a thiol addition to the unsaturated groups of a dendrimer containing silicon atoms, in the presence of a catalyst such as 2,2'-azobisisobutyronitrile (AIBN); while a second method involves epoxidation of an amine or imine terminated dendrimer using a monofunctional glycidoxypolysiloxane, i.e., a monoepoxypropoxy functional polysiloxane.

It has been found that these multi-arm star polymers evidence properties enabling their use in several different and unusual applications, including their use as (i) surface active phase transfer agents, (ii) solubilizers for inorganic cations, metal atoms, and nanoscopic clusters in hostile organic environments, (iii) macromolecular hosts for complexing and encapsulating electrophiles, (iv) catalysis, (v) molecular sensors, (vi) harvesting of metals from aqueous salt solutions, (vi) harvesting of residual polymerization catalysts or initiators from organosilicon polymers, and (vii) compatibilizations of organosilicon polymers and rubbers with various inorganic, organic, or organometallic electrophiles.

In particular, their use as phase transfer agents (i) and solubilizers (ii) was demonstrated by a transport of copper $Cu^{2+}$ cations from an aqueous medium into an organic medium, and their dissolution and retention in the dissolved state; as well as the formation, dissolution, and retention of copper $Cu^0$ metal, in an organic solvent, which represents hostile environments for such species.

As used herein, the term electrophile is intended to mean and includes (i) metal cations, (ii) metal salts, (iii) metal oxides, (iv) elemental metals, (v) water soluble organic molecules, and (vi) water soluble organometallic molecules. Some representative metal cations are $Cu^{1+}$, $Cu^{2+}$, $Fe^{2+}$, $Fe^{3+}$, $Au^{3+}$, $Ag^+$, $Pt^{3+}$, $Rh^{3+}$, $Ni^{2+}$, $Co^{2+}$, and $Cd^{2+}$. Some representative elemental metals are $Au^0$, $Ag^0$, $Co^0$, $Cu^0$, $Ni^0$, or $Pt^0$. Some representative water soluble organic molecules and water soluble organometallic molecules are pigments, dyes, indicators, light sensitizers, radiation sensitizers, catalysts, electro-conductive materials, magnetic materials, non-linear optical materials, liquid crystalline materials, light emitting materials, fluorescent materials, phosphorescent materials, polymerizable monomers, polymerization initiating materials, biomedical materials, pharmaceutical products, biologically active materials, biologically inactive materials, antiseptic materials, and surface active agents. Some particular representative water soluble organic molecules are $C_{37}H_{27}N_3O_3 \cdot 2NaSO_3$ (methylene blue) and $C_{15}H_{15}N_3O_2$ (methyl red).

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

In the compositions according to this invention, the multi-arm star polymer is derived from a dendrimer core, and the arms of the multi-arm star polymer is formed exclusively of organosilicon moieties or polyalkene moieties such as polymethylene. In particular, among the dendrimer cores found to be most suitable for forming these multi-arm star polymers, are for example, polyamidoamine (PAMAM) dendrimer cores, polypropyleneimine (PPI) dendrimer cores, poly(amidoamine-organosilicon) (PAMAMOS) dendrimer cores, and poly(propyleneimine-organosilicon) (PPIOS) dendrimer cores. These dendrimer cores are made up of (a) water soluble amidoamine repeat units such as $-[(CH_2)_2-CO-NH-(CH_2)_2-N]=$, b) water soluble propyleneimine units such as $-[(CH_2)_3N]=$, and (c) organosilicon units.

Such compositions can be prepared by at least two different synthetic methods. The first method is a thiol addition to an unsaturated vinylsilyl functionalized PAMAMOS dendrimer or to an allylsilyl functionalized PAMAMOS dendrimer, whereas the second method involves the epoxidation of an amine or imine terminated PAMAM or PPI dendrimer using a monoepoxypropoxy functional polysiloxane.

In particular, the thiol addition reaction route to PAMAMOS or PPIOS multi-arm star polymers according to the invention involves a catalyzed reaction of a thiol and an unsaturated vinylsilyl terminated PAMAMOS or PPIOS dendrimer or an allylsilyl terminated PAMAMOS or PPIOS dendrimer, as illustrated below for the vinyl terminated reagent:

THIOL ADDITION REACTION

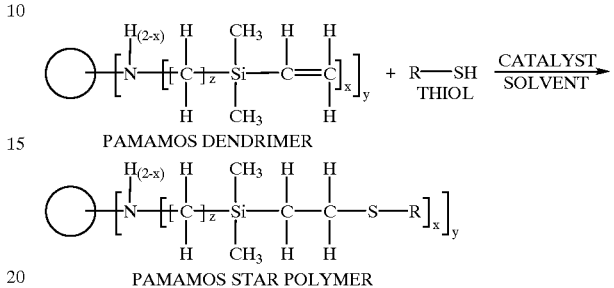

PAMAMOS DENDRIMER

PAMAMOS STAR POLYMER

The catalyst used in the THIOL ADDITION REACTION can be a free radical initiator such as 2,2'-azobisisobutyronitrile (AIBN). The amount of free radical initiator required is typically between about 0.5–2 weight percent with respect to the amount of the PAMAMOS DENDRIMER. Free radical initiators other than AIBN can be used, for example, other azo compounds such as 4,4'-azo-4-cyanopentanoic acid (ACPA), peroxides such as hydrogen peroxide and alkyl peroxides, persulfates, peresters, and peracids.

Common solvents can be employed such as methanol, isopropanol, N,N-dimethylformamide, tetrahydrofuran (THF), dimethylacetamide, dimethylsulfoxide, N-methyl-2-pyrrolidone, hexamethylphosphoramide, chloroform, methylene chloride, tetramethylurea, and mixtures thereof.

In the above illustration, x may have any value larger than zero but smaller or equal to 2. While z is usually 1 or 3, it can have any value between 1 and 6. The precursor PAMAMOS/PPIOS dendrimer may be of any number of generations having 3y or 4y number of vinylsilyl or allylsilyl functional end groups per molecule where y is 1, 2, 3, 4, or more, for example. Depending upon the particular method used in preparing these precursor PAMAMOS/PPIOS dendrimers, the precursor dendrimers may contain one or more layers of organosilicon branch cells around their PAMAM or PPI interiors, and the number of their layers and the composition of their branch cells will necessarily determine the number and the particular type of silicon atom containing moiety in the various arms of the resulting multi-arm star polymer.

While the thiol can be any reactive aliphatic or aromatic R—SH type of compound, the thiol is most preferably a compound R—SH where R represents the group $-(CH_2)_c$ —$CH_3$ in which c is an integer in the range of 1–50. Thiols containing silicon atoms can also be employed, if desired. The thiol addition reaction is typically performed in solution, and can be monitored by a variety of standard techniques among which are $^1H$, $^{13}C$, or $^{29}Si$ Nuclear Magnetic Resonance (NMR), mass or infrared spectroscopy, dilute solution viscometry, Gel Permeation Chromatography (GPC), and Size Exclusion Chromatography (SEC). Representative of a typical condition for such a reaction is one in which a mixture of methanol and tetrahydrofuran is used as the solvent, and in which the reaction is carried out at a temperature in the range of about 60–70° C.

Representative of some thiols which can be used are ethanethiol $CH_3CH_2SH$, 1-propanethiol $CH_3CH_2CH_2SH$, 1-butanethiol $CH_3CH_2CH_2CH_2SH$, isopentyl mercaptan $C_5H_{11}SH$, heptanethiol $C_7H_{15}SH$, 1-dodecanethiol $C_{12}H_{25}SH$, and 1-octadecanethiol $C_{18}H_{37}SH$.

Representative of some thiols containing a silicon atom which can be used are (i) silanes such as mercaptotriphenylsilane and (2-mercaptoethyl)trimethylsilane, and (ii) mercapto functional silicones containing the group $\equiv SiCH_2CH_2CH_2SH$ such as (mercaptopropyl)methylsiloxane polymers and (mercaptopropyl)methylsiloxane dimethylsiloxane copolymers, or mercapto functional silicones containing the group $\equiv SiCH_2CH(CH_3)_2SH$ such as (mercaptoisobutyl)methylsiloxane polymers and (mercaptoisobutyl)methylsiloxane dimethylsiloxane copolymers.

The epoxidation method used to prepare PAMAM/PPI based multi-arm star polymers according to the invention involves the ring opening addition of glycidoxy functionalized organosilicon compounds such as monosubstituted epoxyalkylsilanes or monosubstituted epoxyalkylpolysiloxanes to an amine or imine terminated PAMAM or PPI dendrimer, as generally shown below in the case of a PAMAM dendrimer and a monosubstituted epoxyalkylpolysiloxane:

EPOXIDATION OF AMINE TERMINATED DENDRIMER

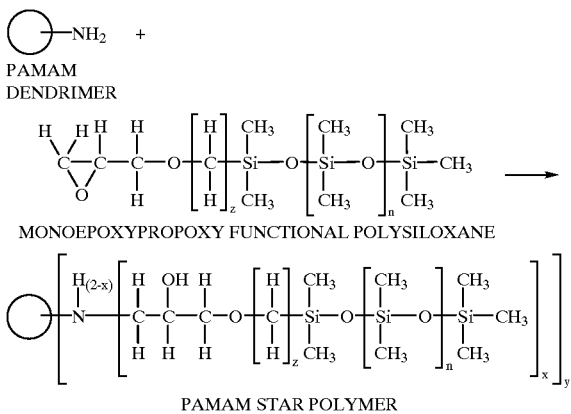

In the above illustration, x may have any value larger than zero but smaller or equal to 2. The value of z can vary generally from 3–6, and n has a value of one or more depending on the viscosity and molecular weigh desired. Most preferred, are monoepoxypropoxy functional polysiloxanes with viscosity and molecular weights varying between 1–200 mm²/s (centistoke) and 300–6,000, respectively. The value of y can be from 3 to several thousand, depending on the generation, i.e., 3(G +1) or 4(G +1) where G is the generation being an integer ranging from 0 to 10.

While monoepoxypropoxy functional polysiloxanes such as the siloxane compositions shown above are preferred, monosubstituted epoxyalkylsilanes can also be used, and some representative silane compositions are shown below.

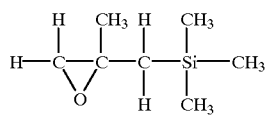

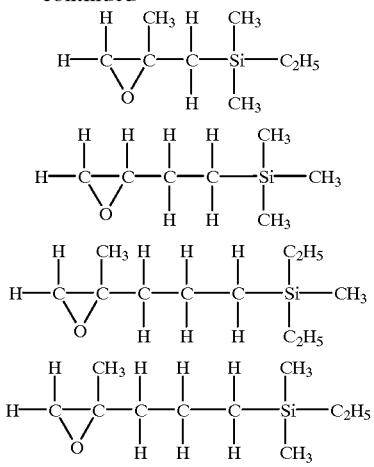

The ring opening addition reaction is typically performed in a polar solvent such as THF, methanol, isopropanol, or mixtures of such polar solvents. If PAMAM dendrimers rather than PPI dendrimers are used in this addition reaction, the reaction temperature should not exceed about 80–90° C. for periods of 12–24 hours, or should not exceed 140° C. for periods of about one hour. Higher reaction temperatures can be employed, however, in the case of PPI dendrimers.

It can be seen, therefore, that multi-arm star polymers of the invention can comprise hydrophilic or hydrophobic type dendrimer based cores with silicon containing arms, in which the composition of the core can be PAMAM, PPI, PAMAMOS, PPIOS, and the number of arms attached to the dendrimer based core is dependent upon the functionality of the dendrimer based core used as precursor of the multi-arm star polymer, as well as the degree of conversion provided during its synthesis. As noted above, while the content of silicon atoms per arm may preferably range from a single silicon atom to about 30 silicon atoms, compositions containing up to 100 silicon atoms can be prepared, if desired.

It has been found that these multi-arm star polymers exhibit a pronounced phase transfer ability, complexation potential, and an ability to participate in forming inorganic-organic nanocomposites. Thus, the hydrophobic character of the exterior arms of PAMAMOS and PPIOS multi-arm star polymers renders them insoluble in water and methanol, but at the same time, they are soluble in polar organic solvents such as THF and chloroform, aliphatic hydrocarbons such as n-hexane, and aromatic hydrocarbons such as toluene.

For example, this was demonstrated using a PAMAMOS multi-arm star polymer prepared from 1-octadecanethiol $C_{18}H_{37}SH$, and a PAMAMOS [3,1] DMVS, i.e., a PAMAMOS dendrimer prepared by adding one layer of organosilicon (OS) branch-cells containing dimethylvinylsilyl (DMVS) end groups to a generation 3 PAMAM dendrimer. It provided a clear, slightly yellow solution when dissolved in chloroform. Similarly, a closely related multi-arm star polymer obtained from a generation 3 amine terminated PAMAM and a monofunctional glycidoxy polysiloxane having a molecular weight of about 1000, provided a clear, colorless solution when dissolved in hexanes.

When an aqueous solution of $CuSO_4$ is added to a vessel containing either of these solutions, two immiscible layers are formed. However, if the systems are thoroughly shaken, a distinct color change was observed to rapidly occur. Thus, the yellow chloroform solution turned green, while the aqueous layer either completely or partially discolored, depending on the initial copper salt concentration, the multi-arm star polymer concentration in the organic phase, and the relative volume of the two phases.

These and similar examples demonstrate the ability of the multi-arm silicon containing PAMAMOS and PPIOS star polymers to transfer electrophiles such as inorganic cations such as $Cu^{2+}$ from their natural habitat in an aqueous medium to a hostile environment such as an organic liquid.

While not being bound by the following theory, it is believed that in the organic phase, and at or near the boundary with the aqueous phase, PAMAMOS multi-arm star polymers have the ability to rearrange their conformation in such a way as to orient the hydrophilic dendrimer interior core towards the boundary and the hydrophobic silicon containing arms towards the organic bulk phase. In such a rearranged conformation, the strongly nucleophilic tertiary amines of the dendrimer interior become capable of attracting and complexing electrophiles such as inorganic cations from the aqueous phase. This enables transport of such electrophiles through the phase boundary and into the organic layer, which is otherwise an environment in which such species do not dissolve.

However, inside the hydrophilic, strongly complexing, dendritic nanoenvironment, inorganic cations can be encapsulated and protected from hostile organic surroundings by the hydrophobic exterior arms of the multi-arm star polymer molecules, and since the arms provide solubility for the entire host molecule, the arms render the electrophiles soluble in the organic phase.

In addition, since an hydrophilic dendritic core is smaller than the wavelength of visible light, i.e., its diameter typically increases with each generation by less than about 1 nm per generation, the size of any complex will remain too small to interfere with visible light, and so this phenomenon results in a clear, colored organic phases containing the dissolved inorganic species. The color will depend upon the particular cation being used, and it should be understood that cations other than $Cu^{2+}$ can be employed, such as $Cu^{1+}$, $Fe^{2+}$, $Fe^{3+}$, $Au^{3+}$, $Ag^+$, $Rh^{3+}$, $Ni^{2+}$, and $Cd^{2+}$, for example.

It has also been determined that while being encapsulated inside the dendritic interior of a PAMAMOS or PPIOS multi-arm star polymer, such inorganic cations as well as other electrophiles, are susceptible to chemical transformation. For example, when a reducing agent such as hydrazine ($H_2NNH_2$) was added to the previously described two phase system containing the $CuSO_4/H_2O$ and the $CuSO_4/$PAMAMOS multi-arm star polymer/hexanes layers, the characteristic blue color of the $Cu^{2+}$ complex readily turned coppery in color, indicating a reduction of the $Cu^{2+}$ cations to elemental copper. The reduced metal, however, remained soluble in the organic phase, within a domain which did not interfere with visible light, allowing for clarity of the coppery solution.

Such phenomenon render the silicon containing multi-arm star polymers of this invention useful in a number of applications including their use as phase transfer agents, molecular encapsulators, surfactants, emulsifiers, personal care products, catalysis, metal harvesting and metal regeneration, liquid purification, environmental protection, compatibilization, preparation of nanoscopic metal particles, metallurgy of alloys, and in the preparation of unusual host/guest supramolecular assemblies such as quantum dots.

EXAMPLES

The following examples are set forth in order to illustrate the invention in more detail. In particular, Examples 1–4 are directed to the preparation of the PAMAMOS dendrimers used in the Thiol Addition Reactions in Examples 5–12; Examples 13–17 are illustrative of the Epoxidation of PAMAM dendrimers; and Examples 18–21 illustrate some useful applications of these multi-arm star polymers.

PAMAMOS DENDRIMERS

Example 1

Preparation of a PAMAMOS [3,1] DMVS dendrimer having dimethylvinylsilyl (DMVS) end groups from a generation 3 EDA core amine terminated PAMAM dendrimer and chloromethyldimethylvinylsilane (CMDMVS)

A generation 3 EDA core PAMAM dendrimer having a nominal content of 32 $NH_2$ end groups was lyophilized in methanol in a round bottomed flask equipped with a Teflon® coated stirring bar, and kept under partial vacuum overnight prior to its use. 3.66 g (0.53 mmol, 33.9 mmol of NH groups) of the obtained crisp white solid was dissolved under nitrogen in 34.5 mL of N,N'-dimethylformamide (DMF), and 6.1 mL (5.48 g, 40.45 mmol) of chloromethyldimethylvinylsilane (CMDMVS) was added to the resulting solution to achieve a molar ratio of the reacting functionalities $[ClCH_2]/[NH]$ of 1:19. Following this procedure, $NaHCO_3$ (4.03 g) was added to the mixture, a vertical condenser was attached to the flask, and the reaction mixture was heated under nitrogen to 80° C., and stirred at that temperature for 121 hours. During this time, aliquots were periodically taken for monitoring the progress of the reaction by $^1H$ and $^{13}C$ NMR which was performed in deuterated methanol $CD_3OD$ with p-dioxane as a reference standard. Heating and stirring were then stopped, and a sample was taken for NMR determination of the degree of NH group conversion achieved during the process. The reaction mixture was filtered, separated salts were rinsed with methanol, and the joined liquids were dialyzed, first in a 50:50 methanol/water mixture, and then in pure methanol. Methanol was evaporated, and the product in which no unreacted NH groups could be detected, was dried overnight under partial vacuum. Analytical data for this product follows. $^1H$ NMR in $CD_3OD$: 0.14 ppm (s, Si—C$\underline{H}_3$); 2.11–3.34 ppm (PAMAM dendrimer protons); 5.71–6.26 ppm (Si—C$\underline{H}$=C$\underline{H}_2$). $^{13}C$ NMR in $CD_3OD$: -2.80 ppm (Si—$\underline{C}H_3$); 34.77 ppm (—$\underline{C}H_2$—C(O)—NH—); 38.25 ppm (—CO—NH—$\underline{C}H_2$—$\underline{C}H_2$—N—($\underline{C}H_2$—Si($CH_3$)$_2$CH=$CH_2$)$_2$); 38.58 ppm (—CO—NH—$\underline{C}H_2$—$\underline{C}H_2$—N=); 50.50 ppm (—CO—NH—$\underline{C}H_2$—$\underline{C}H_2$—N—($\underline{C}H_2$—Si($CH_3$)$_2$CH=$CH_2$)$_2$); 51.09 ppm (—CO—NH—$\underline{C}H_2$—$\underline{C}H_2$—N= and N—$\underline{C}H_2$—$\underline{C}H_2$—CONH—($CH_2$)$_2$—Si≡); 53.48 ppm (=N—$\underline{C}H_2$—$\underline{C}H_2$—CONH—($CH_2$)$_2$—N=); 61.14 (=N—$\underline{C}H_2$—Si≡); 113.16 and 139.67 ppm (≡Si—$\underline{C}H$=$\underline{C}H_2$); 174.16 and 174.45 ppm (—$\underline{C}O$—NH—). $^{29}Si$ NMR in $CD_3OD$: -8.74 ppm (=N—$CH_2$—$\underline{Si}$($CH_3$)$_2$CH=$CH_2$). Differential Scanning Calorimetry (DSC) (under nitrogen from -50° C. to 100° C. at a heating rate of 10° C./min): Glass Temperature $T_g$=-2.5° C.

Example 2

Preparation of PAMAMOS [3,1] DMVS dendrimer having dimethylvinylsilyl (DMVS) end groups from a generation 3 EDA core amine terminated PAMAM dendrimer and in situ prepared iodomethyldimethylvinylsilane (IMDMVS)

Chloromethyldimethylvinylsilane (CMDMVS) (8.1 mL, 7.22 g, 53.64 mmol), 18-Crown-6 ether represented by the structure

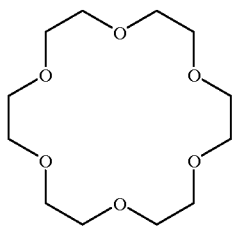

(0.72 g, 2.68 mmol, 5%/[Cl⁻]), sodium iodide (8.87 g, 59 mmol) and DMF (20 mL) were mixed under nitrogen in a dry 250 mL two neck, round bottom flask equipped with a nitrogen inlet and an outlet, a condenser, and mechanical stirrer. Stirring was initiated, the mixture was heated to 60° C., and kept at that temperature overnight to allow for formation of iodomethyldimethylvinylsilane (IMDMVS). To the mixture was added a solution of a generation 3 EDA core PAMAM dendrimer (4.82 g, 0.7 mmol, 44.7 mmol of NH groups) lyophilized as described in Example 1, and NaHCO₃ (6.77 g, 80.46 mmol) in DMF (30 mL). The mixture was vigorously stirred under nitrogen and heated to 80° C. Periodically, a sample of the reaction mixture was taken for NMR monitoring. When a complete disappearance of the silane reagent was detected after 50 hours of reaction, stirring was stopped, and the reaction mixture was allowed to cool to room temperature. The solids were filtered, and the PAMAMOS dendrimer product was isolated from the liquid phase by two stage dialysis. The dialysis was performed, first in a 50:50 methanol/water mixture, and then in pure methanol, using a dialysis bag composed of Spectra/Por 7 dialysis membranes, having a molecular weight cut off (MWCO) of 3500 from Spectrum Medical Industries, Houston, Tex. Spectral features and physical properties of the product were determined to be the same as spectral features and physical properties shown above in Example 1.

The preparation of other dendrimers, similar to the dendrimers prepared in Examples 1 and 2 from generation 3 dendrimers, is described in Examples 3 and 4, in which generation 4 and generation 1 dendrimers, respectively, are employed.

Example 3

Preparation of a PAMAMOS [4,1] DMVS dendrimer having dimethylvinylsilyl (DMVS) end groups from a generation 4 EDA core amine terminated PAMAM dendrimer and chloromethyldimethylvinylsilane (CMDMVS)

A generation 4 EDA core PAMAM dendrimer (5.1 g, 0.36 mmol, 45.95 mmol of NH groups) in methanol, having a nominal content of 64 NH₂ end groups, was dried and then lyophilized from water overnight to form a crisp white solid. This procedure was analogous to the procedure used in Example 1, except that the dendrimer was dissolved in 1-methyl-2-pyrrolidinone (NMP). The components of the reaction mixture were 7.42 g of chloromethyldimethylvinylsilane (CMDMVS) (54.77 mmol), NMP (45 mL), and NaHCO₃ (5.69 g). The reaction mixture was heated to 80° C. with stirring for one week. After reaction was complete as confirmed by ¹H and ¹³C NMR, the reaction mixture was filtered, salts were washed with methanol, the liquids were combined, and dialyzed, first in a 1:1 methanol/water mixture for two days, and then in pure methanol for one 1 week, using a dialysis bag composed of Spectra/Por 7 dialysis membranes having a MWCO of 1000. Methanol was evaporated and the product was dried overnight under vacuum yielding 7.33 g (75.9%). Spectral features were similar to those features obtained for the PAMAMOS [3,1] DMVS dendrimer in Example 1, and the features indicated complete reaction conversion. DSC (under nitrogen from −80 to 100° C. at 10° C./min): $T_g$=−6.1° C.

Example 4

Preparation of PAMAMOS [1,1] DMVS dendrimer having dimethylvinylsilyl (DMVS) end groups from a generation 1 EDA core amine terminated PAMAM dendrimer and chloromethyldimethylvinylsilane (CMDMVS)

The procedure used in this example was similar to the procedure in Example 3, except that 9.4 g of a lyophilized generation 1 EDA core PAMAM dendrimer (7.13 mmol, 114.08 mmol NH groups) was employed. The components of the reaction mixture were 18.8 g of CMDMVS (136.90 mmol), NMP (60 mL), and NaHCO₃ (9.40 g). The reaction mixture was heated at 80° C. for one week. After the reaction was completed as evidenced by NMR, salts were filtered and washed with methanol. The liquids were combined and dialyzed as in Example 3. Drying in a partial vacuum resulted in a yield of 16.47 g of the product (76.9%). Its spectral features were similar to the features in Example 3. DSC (under nitrogen from −80 to 100° C. at 10° C./min) $T_g$=−6.0° C.

THIOL ADDITION REACTIONS

Example 5

Preparation of a 64 arm star polymer having polymethylene [—CH₂—Si—(CH₂)₂—S—(CH₂)₁₁—CH₃] arms emanating from a generation 3 EDA core amine terminated PAMAM dendrimer A three neck round bottom flask was equipped with a vertical condenser, a nitrogen inlet and an outlet, a rubber septum, and a Teflon® coated stirring bar. Either of the PAMAMOS [3,1] DMVS dendrimers of Example 1 or Example 2 (0.86 g, 0.0673 mmol, 4.29 mmol of vinyl groups) were separately treated in this example, and lyophilized overnight prior to their use as in Example 1, and dissolved under nitrogen in anhydrous tetrahydrofuran THF (4.0 mL). 2,2'-azobisisobutyronitrile AIBN (0.043 g, 0.26 mmol, 6.6%/[SH]) was dried under a partial vacuum, mixed under nitrogen with 1-dodecanethiol (0.96 mL, 0.81 g, 4 mmol), and the mixture was added under nitrogen into the stirred dendrimer solution in the reaction flask. The mixture was heated to 65° C. and maintained at that temperature for 45 hours. Periodically, samples were taken for monitoring of the reaction progress by NMR which was determined by tracking disappearance of signals characteristic of dendrimer vinyl groups. The reaction was stopped when no more of the groups could be detected, and the mixture was extracted under dialysis conditions twice, first with acetone, and then in methanol. The resulting 100% alkyl-substituted multi-arm star polymer product in each case was insoluble in acetone and methanol, but soluble in toluene, n-hexane, and chloroform. ¹H NMR in deuterated chloroform CDCl₃: 0.1 ppm (s, ≡Si—C$\underline{H}_3$ and —C$\underline{H}_2$—Si≡); 0.85 ppm (s, —CH₂—C$\underline{H}_3$); 1.22 ppm (s, —(C$\underline{H}_2$)₁₁-alkyl chain); 1.95–3.35 ppm (PAMAM dendrimer protons and —S—C$\underline{H}_2$—). ¹³C NMR in CDCl₃: −3.50 ppm (≡Si—$\underline{C}$H₃); 0.15 ppm (≡Si—$\underline{C}$H₂—); 14.06 ppm (—CH₂—$\underline{C}$H₃); 28.99–29.58 ppm (m, —CH₂)₁₁-alkyl chain); 31.84 ppm (—S—CH₂—$\underline{C}$H₂—); 32.02 (—S—$\underline{C}$H₂—); 33-98-37.55 and 49.02–52.38 ppm (PAMAM dendrimer); 59.57 ppm (PAMAM dendrimer); 130–140 ppm (empty base line in the vinyl group region); 172.5 and 173 ppm (—$\underline{C}$O—NH—). ²⁹Si NMR in CDCl₃: −10 to −5 ppm (empty base line in the Si-vinyl group region); 0.39 ppm (≡N—CH₂—

Si(CH$_3$)$_2$(—CH$_2$—CH$_2$—S—R). DSC (under nitrogen from −100° C. to 150° C. at 10° C./min): T$_m$=−26° C. Differential Thermogravimetric Analysis in N$_2$ at 20° C./min: a single step weight loss process onset at 160° C., maximum rate at 370° C., end at 490° C., leaving total weight residue of 14.4 percent.

Example 6

Preparation of a 64 arm star polymer having polymethylene [—CH$_2$—Si—(CH$_2$)$_2$—S—(CH$_2$)$_{17}$—CH$_3$] arms emanating from a generation 3 tetradendron PAMAM dendrimer core The multi-arm star polymer in this example was prepared by a procedure similar to Example 5, except that 1-octadecanethiol was used instead of 1-dodecanethiol, and THF was used instead of acetone and methanol in the dialysis for the product purification. The components of the reaction mixture were PAMAMOS [3,1] DMVS (0.43 g, 0.0338 mmol, 2.01 mmol of vinyl groups); THF (2.0 mL); 1-octadecanethiol (0.81 mL, 0.73 g, 2.54 mmol); and AIBN (30.5 mg, 0.013 mmol, 5%/[SH]). The total reaction time at 65° C. was 16.25 hours. NMR spectra of the product corresponded with spectra in Example 5. Gel Permeation Chromatography GPC in a THF/MeOH mixture (98:2) at 1 mL/min with PL gel columns: a single sharp peak at 18 min with a slight shoulder at longer retention times; polydispersity less than 1.2. DSC (in nitrogen from −20° C. to 100° C. at 10° C./min), two endotherms at 40° C. (strong), and at 53° C. (medium to weak), reproducible through three heating/cooling cycles, and for 1-octadecanethiol T$_m$=31–35° C.

Example 7

Preparation of an 128 arm star polymer having [—CH$_2$—Si—(CH$_2$)$_2$—S—(CH$_2$)$_2$—CH$_3$] arms emanating from a generation 4 tetradendron PAMAM dendrimer core The procedure used in this example was similar to Example 5, except the solvent was a 1:4 mixture of THF/MeOH. The 128 arm star polymer was formed from 2.23 g PAMAMOS [4,1] DMVS (0.08 mmol, 10.24 mmol of vinyl groups) dissolved in a THF (40.4 mL)/MeOH (10.7 mL) mixture. To the mixture was added 0.13 g AIBN (0.79 mmol, 5.0%/[SH]) in THF (1.4 g), and 1.21 g of 1-propanethiol (15.89 mmol). The mixture was heated to 65° C. overnight. NMR indicated completion of the reaction, and the product was dialyzed in a 1:2 MeOH/hexane mixture for one week. The product was dried in a partial vacuum yielding 2.30 g (75.7%). The spectral features of the product were similar to the features of the product in Example 5. DSC under nitrogen from −80 to 100° C. at 10° C.C/min: T$_g$=−4.7° C.

Example 8

Preparation of an 128 arm star polymer having [—CH$_2$—Si—(CH$_2$)$_2$—S—(CH$_2$)$_6$—CH$_3$] arms emanating from a generation 4 tetradendron PAMAM dendrimer core Following the procedure used in Example 7, the 128 arm star polymer was formed by adding heptanethiol (2.10 g, 15.88 mmol) to a reaction mixture of 2.3 g PAMAMOS [4,1] DMVS (0.08 mmol, 10.24 mmol of vinyl groups), 0.13 g AIBN (0.79 mmol, 5.0%/[SH]), THF (42.3 mL), and MeOH (8.5 g). The mixture was heated to 65° C. overnight, and the sample was purified by dialysis as in Example 7, yielding 2.62 g of product (72.1%). The spectral features were similar to features in Example 5. DSC under nitrogen from −80 to 100° C. at 10° C./min) T$_g$=−16.0° C.

Example 9

Preparation of an 128 arm star polymer having [—CH$_2$—Si—(CH$_2$)$_2$—S—(CH$_2$)$_{17}$—CH$_3$] arms emanating from a generation 4 tetradendron PAMAM dendrimer core An 128 arm star polymer was formed by a procedure similar to Example 7 using as reaction components 2.3 g PAMAMOS [4,1] DMVS (0.08 mmol, 10.24 mmol of vinyl groups), 0.13 g AIBN (0.79 mmol, 5.0%/[SH]), 4.56 g of octadecanethiol (15.91 mmol), THF (42.0 mL), and MeOH (10.7 mL). The mixture was heated to 65° C. overnight and purified by dialysis as in Example 7 yielding 3.66 g of product (73.2%). The spectral features were similar to features described in Example 5. Physical features of the viscous material were similar to analyses in Example 6. DSC under nitrogen from −80 to 100° C. at 10° C./min): two endotherms at 41.6° C. and 55.0° C., T$_m$ for 1-octadecanethiol=31° C.

Example 10

Preparation of a 16 arm star polymer having [—CH$_2$—Si—(CH$_2$)$_2$—S—(CH$_2$)$_2$—CH$_3$] arms emanating from a generation 1 tetradendron PAMAM dendrimer core A 16 arm star polymer was formed by a procedure similar to Example 7 using as the reaction components 4.8 g PAMAMOS [1,1] DMVS (1.61 mmol, 19.3 mmol of vinyl groups), 0.16 g AIBN (0.97 mmol, 5.0%/[SH]), 1.47 g of propanethiol (19.3 mmol), THF (44.3 mL), and MeOH (12.4 mL). The mixture was heated to 65° C. overnight and purified by dialysis as in Example 7. The spectral features were similar to the features in Example 5. DSC under nitrogen from −80 to 100° C. at 10° C./min): T$_{g1}$=−32.6° C. and T$_{g2}$=5.2° C.

Example 11

Preparation of 16 arm star polymer having [—CH$_2$—Si—(CH$_2$)$_2$—S—(CH$_2$)$_{11}$—CH$_3$] arms emanating from a generation 1 tetradendron PAMAM dendrimer core A 16 arm star polymer was formed by a procedure comparable to Example 7 using as reaction components 4.8 g PAMAMOS [1,1] DMVS (1.61 mmol, 19.3 mmol of vinyl groups), 0.16 g AIBN (0.97 mmol, 5.0%/[SH]), 3.91 g of dodecanethiol (19.3 mmol), THF (44.3 mL), and MeOH (12.4 mL). The mixture was heated to 65° C. overnight and purified by dialysis as described in Example 7. Spectral features were similar to features described in Example 5. DSC under nitrogen from −80 to 100° C. at 10° C./min): T$_m$=−4.3° C.

Example 12

Preparation of 16 arm star polymer having [—CH$_2$—Si—(CH$_2$)$_2$—S—(CH$_2$)$_{17}$—CH$_3$] arms emanating from a generation 1 tetradendron PAMAM dendrimer core A 16 arm star was formed by a procedure similar to Example 7 using as the reaction components 4.8 g PAMAMOS [1,1] DMVS (1.61 mmol, 19.3 mmol of vinyl groups), 0.16 g AIBN (0.97 mmol, 5.0%/[SH]), 5.54 g of octadecanethiol (19.3 mmol), THF (44.3 mL), and MeOH (12.4 mL). The mixture was heated to 65° C. overnight and purified by dialysis as in Example 7 to yield 3.66 g of product (73.2%). The spectral features were similar to features in Example 5. DSC under nitrogen from −100 to 100° C. at 10° C./min): two endotherms at 41.2° C. and 56.1° C.

EPOXIDATIONS OF PAMAM DENDRIMERS

Example 13

Preparation of a 32 arm star polymer having {—CH$_2$—CH(OH)—CH$_2$—O—(CH$_2$)$_3$—[Si(CH$_3$)$_2$O]$_n$—Si(CH$_3$)$_2$—C$_4$H$_9$} arms (n$_{av.}$=10–11; MW~1000) emanating from a generation 2 tetradendron PAMAM dendrimer A 500 mL three neck round bottom flask was equipped with a vertical condenser, a nitrogen inlet and an outlet, and a Teflon® coated stirring bar. The flask was charged with a 2-propanol solution (80 mL) of a generation 2 EDA core amine terminated PAMAM dendrimer (2.31 g of a 26.46 weight percent methanol solution, 6.00 mmol of NH groups) and a mono-(2,3,-epoxypropyl)propylether polysiloxane) (EpPS) ($M_n$=1000) (7.20 g, 7.20 mmol, [epoxy]/[NH]=1.2). The reaction mixture was stirred for 24 hours under nitrogen in a 65° C. oil bath. Volatiles were stripped under a reduced pressure using a rotoevaporator, and the oil remaining was thoroughly washed with methanol using six 50 mL portions to remove unreacted reagents. A colorless viscous product was obtained (2.92 g, 81% yield of —NHR product). $^1$H NMR in CDCL$_3$: 0.01 ppm (s with satellites, ≡Si—C$\underline{H}_3$); 0.42–0.50 ppm (m, —SiMe$_2$C$\underline{H}_2$—); 0.82 ppm (t, —CH$_2$C$\underline{H}_3$); 1.23–1.27 ppm [m, (—C$\underline{H}_2$)$_2$CH$_3$]; 1.53 ppm (b, —OCH$_2$C$\underline{H}_2$—); 2.29–3.80 ppm (bm, PAMAM dendrimer protons and —NHC$\underline{H}_2$C$\underline{H}$(OH)C$\underline{H}_2$OC$\underline{H}_2$—); 7.80 ppm (b, N$\underline{H}$ and O$\underline{H}$). $^{13}$C NMR in CDCl$_3$: 0.92 ppm (s with satellites, ≡SiC$\underline{H}_3$); 13.67 ppm (s, —CH$_2$C$\underline{H}_3$); 14.06 ppm (s, —SiMe$_2$[C$\underline{H}_2$]$_3$CH$_3$ or —SiMe$_2$[C$\underline{H}_2$]$_2$CH$_2$—O—); 17.87 ppm (s, —SiMe$_2$[C$\underline{H}_2$]$_3$CH$_3$ or SiMe$_2$[C$\underline{H}_2$]$_2$CH$_2$—O—); 23.01 ppm (s, —SiMe$_2$[C$\underline{H}_2$]$_3$CH$_3$ or —SiMe$_2$[C$\underline{H}_2$]$_2$CH$_2$—O—); 25.37 ppm (s, —SiMe$_2$[C$\underline{H}_2$]$_3$CH$_3$ or —SiMe$_2$[C$\underline{H}_2$]$_2$CH$_2$—O—); 26.26 ppm (s, —SiMe$_2$[C$\underline{H}_2$]$_3$CH$_3$ or —SiMe$_2$[C$\underline{H}_2$]$_2$CH$_2$—O—); 34.16 ppm (bs, C$\underline{H}_2$CONH—); 37.71 ppm (s, PAMAM C$\underline{H}_2$—); 39. 25 ppm (s, PAMAM C$\underline{H}_2$—); 41.47 ppm (s, NH$_2$[C$\underline{H}_2$]$_2$—); 42.21 ppm (s, NH$_2$[C$\underline{H}_2$]$_2$—); 48.85 ppm (s, PAMAM C$\underline{H}_2$—); 50.32 (s, PAMAM C$\underline{H}_2$—); 52.46 ppm (s, PAMAM-C$\underline{H}_2$—); 59.00 ppm (s, —NC$\underline{H}_2$CHOH); 60.50 ppm (s, NC$\underline{H}_2$CHOH); 67.38 ppm (s, disubstituted =C$\underline{H}$OH), 68.91 ppm (s, monosubstituted =C$\underline{H}$OH); 73.29 ppm (s, =CHOHC$\underline{H}_2$—); 73.62 ppm (s, =CHOHC$\underline{H}_2$—); 74.34 ppm (s, —OC$\underline{H}_2$CH$_2$—); 172.86 ppm (s, $\underline{C}$=O); the ratio of integrals for —CH$_2$—C$\underline{H}_2$—CONH— at 34.16 ppm normally 28 atoms per dendrimer, and —CH$_2$—C$\underline{H}$OH— at 68.91 ppm, indicated a degree of —NHR substitution of 84 percent. $^1$H NMR showed no presence of unreacted epoxy ring protons indicating a pure product. On average, the PAMAMOS multi-arm star polymer was considered as having —CH$_2$—CH(OH)—CH$_2$—O—(CH$_2$)$_3$—[Si(CH$_3$)$_2$O]$_x$—Si(CH$_3$)$_2$—C$_4$H$_9$ arms emanating from secondary amine —NH— bridging groups, although both $^{13}$C and $^1$H NMR showed trace amounts of unreacted —CH$_2$CH$_2$NH$_2$ groups and disubstituted tertiary amine —N<units. IR on KBr, only some peaks listed: 3292 cm$^{-1}$ v(N—H or O—H); 3074 cm$^{-1}$ v(N—H or O—H); 1648 cm$^{-1}$ v(C=O); 1555 cm$^{-1}$ v(CNH); 1092 cm$^{-1}$ v(Si—O—Si); 1024 cm$^{-1}$ v(Si—O—Si).

Example 14
Preparation of a 64 arm star polymer having {—CH$_2$—CH(OH)—CH$_2$—O—(CH$_2$)$_3$—[Si(CH$_3$)$_2$—O]$_n$—Si(CH$_3$)$_2$—C$_4$H$_9$} arms ($n_{av.}$ =10–11; MW~1000) emanating from a generation 3 tetradendron PAMAM dendrimer A 50 mL two neck round bottom flask was equipped with a vertical condenser, a nitrogen inlet and an outlet, a rubber septum, and a Teflon® coated stirring bar. The flask was charged with a methanol solution of a generation 3 amine terminated EDA core PAMAM dendrimer (0.71 g of a 31.02 weight percent solution, dendrimer: 0.22 g, 0.032 mmol, 2.03 mmol of NH groups); methanol (1.4 mL, total methanol present including solvent from the PAMAM dendrimer solution: 2.0 mL); a mono-(2,3-epoxypropyl)propylether terminated polysiloxane (EpPS) ($M_n$=1000) (2.02 g, 2.02 mmol, [epoxy]/[NH]=0.996), and THF (2.0 mL). The reaction mixture was stirred and heated to 70° C. Stirring was stopped after 17 hours, the mixture was poured into a 10 times larger volume of methanol, and allowed to settle under refrigeration. Two phases formed after 17 days, one a heavier oily phase at the bottom, and the other a lighter cloudy methanol phase at the top. The methanol phase was decanted, the oil was redissolved in methylene chloride, and the solvent was evaporated under a partial vacuum. $^1$H NMR in CDCl$_3$: 0.05 ppm (≡Si—CH$_3$); 0.5 ppm (—CH$_2$—Si(CH$_3$)$_2$—O—); 0.85 ppm (—CH$_2$—CH$_3$); 2.1–3.95 ppm (PAMAM dendrimer protons); 7.95 ppm (—CO—NH—). $^{29}$Si NMR in CDCl$_3$: 3 peaks at −17.3, −16.88, and 6.03 ppm. $^{13}$C NMR in CDCl$_3$: from the ratio of integrals for —CH$_2$—CH$_2$—CO—NH— at 34.3 ppm which is nominally 60 atoms per dendrimer and for Si—CH$_3$ at 0 ppm which is nominally 22 atoms per arm, assuming $x_{av}$. was 11, the number of arms attached per dendrimer was 58, and the degree of NH substitution was 91 percent.

Example 15
Preparation of the 64 arm star polymer of Example 14 in a single solvent The multi-arm star polymer of Example 14 was prepared by reacting a generation 3 EDA core amine terminated PAMAM dendrimer (1 g of a 27.5 weight percent methanol solution, 2.55 mmol of NH groups), and a mono-(2,3-epoxypropyl)propylether polysiloxane (EpPS) ($M_n$=1000) (3.06 g, 3.06 mmol, [epoxy]/[NH]=1.2) in 2-propanol (80 mL), under nitrogen at 70° C. for 22 hours. Volatiles were distilled under reduced pressure using a rotoevaporator, and the remaining oil was washed with methanol three times using 30 mL portions to remove unreacted reagents. The structure of the product (2.28 g; 64% yield) was confirmed by NMR, and by IR on KBr in cm$^-$: 800 (s.s., Si—CH$_3$); 1025–1092 (s.d., Si—O—Si); 1261 (s.s., Si—CH$_3$); 1413 and 1447 (w.s., Si—CH$_3$); 1551 (m.s., NH); 1646 (m.s., C=O); 2861 and 2928 (m.s., CH$_2$); 2874 (m.s., CH$_3$); 2962 (s.s., CH$_3$); 3080 (w.s., NH) and 3300 (m.s., NH); where s.s. is strong singlet, s.d. is strong doublet, w.s. is weak singlet, and m.s. is medium singlet. Size Exclusion Chromatography/Multiple Angle Laser Light Scattering SEC-MALLS (toluene; PL gel B columns; MW values relative to PS): $M_n$=64800; $M_w$=66700, PD=1.03, indicated a 93 percent NH substitution.

Example 16
Preparation of an 128 arm star polymer having {—CH$_2$—CH(OH)—CH$_2$—O—(CH$_2$)$_3$—[Si(CH$_3$)$_2$O]$_n$—Si(CH$_3$)$_2$—C$_4$H$_9$ arms ($n_{av.}$=10–11; MW~1000) emanating from a generation 4 tetradendron PAMAM dendrimer The multi-arm star polymer in this example was prepared by a procedure analogous to Example 13. The reaction mixture components were a 2-propanol solution (80 mL) of a generation 4 EDA core amine terminated PAMAM dendrimer (2.89 g of a 23.07 weight percent methanol solution, 6.00 mmol of NH groups), and a mono-(2,3,-epoxypropyl) propylether polysiloxane (EpPS) ($M_n$=1000) (7.20 g, 7.20 mmol, [epoxy]/[NH]=1.2). The colorless viscous product (2.98 g, yield 81% of —NHR product) showed $^1$H and $^{13}$C NMR in CDCl$_3$ and IR on KBr completely corresponding to the spectra in Example 13. The ratio of integrals for —CH$_2$—C$\underline{H}_2$—CONH— at 34.07 ppm normally 124 atoms per dendrimer, and —CH$_2$—C$\underline{H}$OH— at 68.89 ppm, indicated that the average degree of —NH$_2$ substitution to the —NH-arms was 72 percent.

Example 17
Preparation of a 4 arm star polymer having {—CH$_2$—CH(OH)—CH$_2$—O—(CH$_2$)$_3$—[Si(CH$_3$)$_2$O]$_n$—Si(CH$_3$)$_2$—C$_4$H$_9$ arms ($n_{av.}$=64–65; MW~5000) from a generation 0 tetradendron PAMAM dendrimer The multi-arm star polymer in this example was also prepared by a procedure analogous to Example 13. The reaction mixture components were a 2-propanol solution (80 mL) of a generation 0 EDA core amine terminated PAMAM dendrimer (0.38 g of a 45.59 weight percent methanol solution, 2.70 mmol of NH groups), and a mono-(2,3,-epoxypropyl)propylether polysiloxane (EpPS) ($M_n$=5000) (15.00 g, 3.00 mmol, [epoxy]/[NH]=1.11). A viscous oil residue was obtained and after stripping volatiles under a reduced pressure in a rotoevaporator, it was extracted with three portions of 50 mL hexanes, followed by filtration. Hexanes were evaporated under a reduced pressure in the rotoevaporator, and the product was dried in a partial vacuum for 16 hours. A colorless viscous oil was obtained (14.8 g) showing the following IR on KBr, with only some peaks listed: 3299 cm$^{-1}$ v(N—H or O—H); 3047 cm$^{-1}$ v(N—H or O—H); 1647 cm$^{-1}$ v(C=O); 1558 cm$^{-1}$ v(CNH); 1096 cm$^{-1}$ v(Si—O—Si); 1022 cm$^{-1}$ v(Si—O—Si). No PAMAM signals were observed in either the $^1$H or $^{13}$C NMR spectra. While not being bound, the reason postulated is that the high content of dimethylsiloxy units in long arms of this particular star polymer suppressed the small PAMAM interior. However, the hexanes soluble crude product showed the presence of PAMAM segments, which in their unreacted form, are not soluble in hexane.

APPLICATIONS OF MULTI-ARM STAR POLYMERS

Example 18
Preparation of Green Chloroform by phase transfer and solubilization of $Cu^{2+}$ cations from an aqueous solution The 64 arm star polymer of Example 6 was dissolved in chloroform and provided a clear yellow colored solution. A blue colored water solution of $CuSO_4$ was added, and a non-mixable two-phase system was produced consisting of a blue aqueous top layer and a yellow organic bottom layer. The system was vigorously stirred for about 60 minutes and remained two-phased, but the organic chloroform bottom layer became colored green. This change in coloration from yellow to green remained for several weeks and no precipitate formation was observed.

Example 19
Preparation of Blue Methylene Chloride and Blue Chloroform by phase transfer and solubilization of $Cu^{2+}$ cations from an aqueous solution into an organic solvent Multi-arm star polymers of Example 7, 8, and 9, were each dissolved in methylene chloride and chloroform to provide six clear solutions. A blue colored aqueous solution of $CuSO_4$ was added to each of these solutions and immiscible two-phase systems were formed consisting of a blue aqueous layer on top of a colorless organic layer. The six systems were each vigorously shaken for one hour to form emulsions. The emulsions were left to settle, and they separated into two immiscible phases. In each case, the organic phase was colored deep blue indicating the presence of $Cu^{2+}$ cations.

Example 20
Preparation of Blue Hexanes by phase transfer and solubilization of $Cu^{2+}$ cations from an aqueous solution into hexane The multi-arm star polymers of Example 7, 8, and 9 were each dissolved in hexane to provide three clear solutions. A blue colored aqueous solution of $CuSO_4$ was added to each of the three clear solutions to form immiscible two-phase systems each consisting of a colorless hexane layer on top of a blue aqueous layer. The three systems were each vigorously shaken for 1 hour to form emulsions. The emulsions were left to settle and separated into two immiscible phases. In each case, the organic phase was colored deep blue indicating the presence of $Cu^{2+}$ cations.

Example 21
Preparation of Blue Hexanes by phase transfer, solubilization of $Cu^{2+}$ cations from an aqueous solution, and preparation of hexanes soluble $Cu^0$ nano-composites The 32 arm star polymer of Example 13 (0.045 g) was dissolved in hexanes (2 mL) to provide a clear colorless solution. A bluish-green opaque solution of $Cu(OC(O)CH_3)_2$ (0.0443 g, 2.22×10$^{-5}$ mol) in water (1 mL) and methanol (0.5 mL) mixture was added to the solution and the two-phase system was vigorously shaken for about 30 minutes. When the two phases reformed after standing, the lighter organic hexanes phase turned clear blue, while the heavier aqueous phase faded but remained bluish-green and opaque. Hydrazine (0.1 g, 3.13 mmol) was added to the system, and the system was again shaken for about one minute. Both phases gradually turned a red-brown indicating a reduction of $Cu^{2+}$ into $Cu^0$. After a short period of time, the $Cu^0$ in the aqueous phase deposited to the glass walls of the container to form a copper mirror. The aqueous phase turned clear and colorless but the hexane phase remained stable red-brown, indicating that elemental copper remained soluble in an hostile environment. The copper remained encapsulated within the PAMAM interior of the 16 arm star polymer.

Other variations may be made in compounds, compositions, methods, cations, salts, and metals described herein without departing from the essential features of the invention. The embodiments of the invention specifically illustrated herein are exemplary only and not intended as limitations on their scope except as defined in the appended claims.

What is claimed is:

1. A composition of matter comprising a multi-arm star polymer derived from a silicon containing dendrimer, the star polymer having a plurality of arms containing the moiety

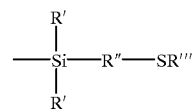

where each R' is an alkyl group containing 1–6 carbon atoms or an aryl group; R" is alkylene radical —$(CH_2)_a$— in which a has a value of 2 or 3; and R''' is the —$(CH_2)_bCH_3$ group in which b has a value of 1–50.

2. A composition according to claim 1 in which the silicon containing dendrimer is a poly(amidoamine-organosilicon) (PAMAMOS) or poly(propyleneimine-organosilicon) (PPIOS) dendrimer.

3. A composition of matter comprising an electrophile encapsulated within a multi-arm star polymer selected from the group consisting of (i) a non-crosslinked multi-arm star polymer derived from amine or imine terminated dendrimers which have been reacted with a monofunctional glycidoxy organosilicon composition, and (ii) a non-crosslinked multi-arm star polymer derived from silicon containing dendrimers, the multi-arm star polymer (ii) having a plurality of arms containing the moiety

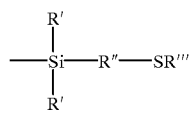

where each R' is an alkyl group containing 1–6 carbon atoms or an aryl group; R" is alkylene radical —$(CH_2)_a$— in which a has a value of 2 or 3; and R'" is the —$(CH_2)_b CH_3$ group in which b has a value of 1–50.

4. A composition according to claim 3 in which the dendrimers are selected from the group consisting of polyamidoamine (PAMAM), polypropyleneimine (PPI), poly (amidoamine-organosilicon) (PAMAMOS), and poly (propyleneimine-organosilicon) (PPIOS) dendrimers.

5. A composition according to claim 3 in which the electrophile is (i) a metal cation, (ii) a metal salt, (iii) a metal oxide, (iv) an elemental metal, (v) a water soluble organic molecule, or (vi) a water soluble organometallic molecule.

6. A composition according to claim 5 in which the electrophile is a metal cation selected from the group consisting of $Cu^{1+}$, $Cu^{2+}$, $Fe^{2+}$, $Fe^{3+}$, $Au^{3+}$, $Ag^+$, $Rh^{3+}$, $Ni^{2+}$, and $Cd^{2+}$.

7. A composition according to claim 5 in which the electrophile is elemental metal $Au^0$, $Ag^0$, $Co^0$, $Cu^0$, $Ni^0$, or $Pt^0$.

8. A composition according to claim 5 in which the electrophile is a water soluble organic molecule or a water soluble organometallic molecule selected from the group consisting of pigments, dyes, indicators, light sensitizers, radiation sensitizers, catalysts, electro-conductive materials, magnetic materials, non-linear optical materials, liquid crystalline materials, light emitting materials, fluorescent materials, phosphorescent materials, polymerizable monomers, polymerization initiating materials, biomedical materials, pharmaceutical products, biologically active materials, biologically inactive materials, antiseptic materials, and surface active agents.

9. A method of transferring an electrophile from an aqueous phase to an organic phase comprising adding an aqueous solution of an electrophile to an organic solution containing a multi-arm star polymer, and mixing the aqueous solution and the organic solution, the multi-arm star polymer being selected from the group consisting of (i) multi-arm star polymers derived from amine or imine terminated dendrimers which have been reacted with a monofunctional glycidoxy organosilicon composition, and (ii) multi-arm star polymers derived from silicon containing dendrimers, the multi-arm star polymers (ii) having a plurality of arms containing the moiety

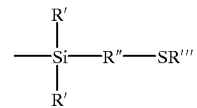

where each R' is an alkyl group containing 1–6 carbon atoms or an aryl group; R" is alkylene radical —$(CH_2)_a$— in which a has a value of 2 or 3; and R'" is the —$(CH_2)_b CH_3$ group in which b has a value of 1–50.

10. A method according to claim 9 in which the dendrimers are selected from the group consisting of polyamidoamine (PAMAM), polypropyleneimine (PPI), poly (amidoamine-organosilicon) (PAMAMOS), and poly (propyleneimine-organosilicon) (PPIOS) dendrimers.

11. A method according to claim 9 in which the electrophile is (i) a metal cation, (ii) a metal salt, (iii) a metal oxide, (iv) an elemental metal, (v) a water soluble organic molecule, or (vi) a water soluble organometallic molecule.

12. A method according to claim 11 in which the electrophile is a metal cation selected from the group consisting of $Cu^{1+}$, $Cu^{2+}$, $Fe^{2+}$, $Fe^{3+}$, $Au^{3+}$, $Ag^+$, $Rh^{3+}$, $Ni^{2+}$, and $Cd^{2+}$.

13. A method according to claim 11 in which the electrophile is elemental metal $Au^0$, $Ag^0$, $Co^0$, $Cu^0$, $Ni^0$, or $Pt^0$.

14. A method according to claim 11 in which the electrophile is a water soluble organic molecule or a water soluble organometallic molecule selected from the group consisting of pigments, dyes, indicators, light sensitizers, radiation sensitizers, catalysts, electro-conductive materials, magnetic materials, non-linear optical materials, liquid crystalline materials, light emitting materials, fluorescent materials, phosphorescent materials, polymerizable monomers, polymerization initiating materials, biomedical materials, pharmaceutical products, biologically active materials, biologically inactive materials, antiseptic materials, and surface active agents.

* * * * *